United States Patent [19]
Nozawa

[11] Patent Number: 5,803,795
[45] Date of Patent: Sep. 8, 1998

[54] METHOD OF TREATING INNER SURFACE OF HIGH-PRESSURE GAS VESSEL

[75] Inventor: Shigeyoshi Nozawa, Tokyo, Japan

[73] Assignee: Teisan Kabushiki Kaisha, Tokyo, Japan

[21] Appl. No.: 679,672

[22] Filed: Jul. 12, 1996

[30] Foreign Application Priority Data

Jul. 12, 1995 [JP] Japan ................................. 7-175667

[51] Int. Cl.[6] ........................................... B24B 1/04
[52] U.S. Cl. ............................... 451/35; 451/36; 451/51; 451/61; 134/8
[58] Field of Search .................. 134/3, 8, 26, 41; 422/12, 28; 451/32, 35, 36, 51, 61, 328, 329

[56] References Cited

U.S. PATENT DOCUMENTS

| | | |
|---|---|---|
| 3,035,909 | 5/1962 | Holt . |
| 3,650,831 | 3/1972 | Jungermann et al. . |
| 3,833,417 | 9/1974 | Grisparis . |
| 3,879,216 | 4/1975 | Austin . |
| 4,807,403 | 2/1989 | Kobayashi et al. . |
| 5,355,638 | 10/1994 | Hoffman ................................. 451/32 |

*Primary Examiner*—Timothy V. Eley
*Attorney, Agent, or Firm*—Young & Thompson

[57] ABSTRACT

A method of treating an inner surface of a high-pressure gas vessel is disclosed. In the method, abrasive containing rust preventive is charged into the vessel made preferably of manganese steel or chrome-molybdenum steel and a wet-grinding step is carried out to obtain a maximum inner surface roughness of the vessel of 3 μm or less. Thereafter, the inner surface is rinsed with an acidic rinsing solution.

7 Claims, 6 Drawing Sheets

METHOD OF TREATING INNER SURFACE OF HIGH-PRESSURE GAS VESSEL

BACKGROUND OF THE INVENTION

1. Field of the Invention

The present invention relates to a method of treating an inner surface of a high-pressure gas vessel, and more particularly to a method in which an inner surface of a high-pressure gas vessel made of manganese steel, chrome-molybdenum steel or the like is wet-ground with abrasive including rust preventive and then rinsed.

2. Description of the Related Art

As such method of treating an inner surface of a high-pressure gas vessel made of manganese steel, chrome-molybdenum steel or the like, there is known a method of dry-grinding the surface. However, with the drying-grinding treatment alone, the maximum inner surface roughness: Rmax, of the vessel remains as large as 6 μm or more. Then, when gas is taken out of the vessel under high pressure, cluster (or solid particles) of the material forming the high-pressure vessel may be stripped off the inner wall surface of the vessel and this stipped-off material may mix into the gas as dust. If this gas is used in a CVD device for instance, the contamination of the gas with the dust of metal cluster of manganese steel, chrome-molybdenum or the like will result in an electrical insulation or conduction failure in the final product manufactured by the CVD device. Hence, there has been the demand for an improved treating method capable of achieving greater fineness (smoothness) on the inner surface so as to restrict generation of dust from the inner surface of the high-pressure gas vessel.

As one such method, the convention has contemplated use of the wet-grinding method for treating the vessel interior to achieve a maximum inner surface roughness of 3 μm or less. In the case of this method, the dust generation due to the stripping-off of the cluster of the material forming the high-pressure gas vessel may be restricted indeed. Yet, with the reduction of the maximum inner-surface roughness Rmax, the surface becomes more vulnerable to oxidation, so that cluster of oxidation product or rust of the vessel forming material is likely to be generated as dust. For this reason, the convention has also suggested use of abrasive containing rust preventive in combination with the wet-grinding method. In this case, it was believed that by a water-rinsing operation for removing the dust such as the grinding scraps, fine rust-proof film alone would remain on the inner surface of the gas vessel so as to prevent mixing of dust into the gas to be taken out from the vessel.

As a matter of fact, it has been found out that the above-described treatment method including the step of wet-grinding the interior of the gas vessel with abrasive including rust preventive and the subsequent step of water-rinsing the vessel interior cannot completely prevent mixing of dust into the gas (see FIG. 1(B)).

Taking the above-described state of the art into consideration, an object of the present invention is to provide a further improved method of treating an inner surface of a high-pressure vessel made of manganese steel, chrome-molybdenum steel or the like, which method is capable of substantially completele prevention of mixing of dust into gas to be taken out of the vessel.

SUMMARY OF THE INVENTION

The above-noted object is accomplished by the respective inventions defined in the appended claims for a patent application.

According to the characterizing features of the present invention, there is provided a method of treating an inner surface of a high-pressure gas vessel, the vessel being made preferably of manganese steel, chrome-molybdenum steel or the like, the method including the step of wet-grinding the interior of the vessel and the subsequent step of rinsing the vessel interior;

wherein;

said wet-grinding step is effected to obtain in the vessel interior a maximum inner-surface roughness Rmax of 3 um or less; and said step of rinsing the vessel interior includes a step of an acid rinsing (pickling) step using an acidic rinsing (pickling) solution.

Preferably, the acidic rinsing (pickling) solution contains, as the acidic component thereof, at least one selected from the group consisting of diammonium citrate, sodium dihydrogen phosphate and sodium hydrogen diphosphate.

Functions and effects of the features will be described next.

According to findings made through experiments conducted by the present inventors, as illustrated in FIG. 1, in the case of a high-pressure gas vessel made of manganese steel which was not treated by the wet-grinding method using abrasive containing rust preventive, a variety of metal components were found to be present in the order of 100 ppb (weight) in total in pure water used in a rinsing operation of this vessel (see FIG. 1(D)). Further, in the case of another high-pressure gas vessel made also of manganese steel but which was treated by the wet-grinding method, though decreased in quantity to some extent, pure water used in the rinsing operation of this vessel still contained a variety of metal components in the order of a few to several tens of ppb in total (see FIG. 1(B)).

The above-described experiment results led the present inventors to an assumption that the dust such as grinding scraps is adsorbed (or fixed) in some manner to a rust-proof film formed during the wet-grinding process and this fixedly adsorbed dust can hardly be removed by the simple water-running operation, so that the un-removed dust may mix into the gas when it is taken out of the vessel under pressure. Then, the inventors reasoned that the adsorbed dust could be removed or desorbed from the dust-proof film by a rinsing operation using an acidic rinsing solution. To confirm the validity of this assumption, the inventors proceeded to conduct a further experiment in which various kinds of acidic rinsing solutions were used to rinse the inner surface of the manganese steel high-pressure gas vessel which had been subjected to the wet-grinding operation with abrasive containing rust preventive. This experiment revealed that this rinsing method can effectively prevent mixing of dust into the gas (see FIG. 1(A)).

Incidentally, substantially the same result as above was obtained in the case of a still further similar experiment made on a high-pressure gas vessel made of chrome-molybdenum steel.

Moreover, if the acid rinsing liquid contains, as the acidic component thereof, at least one selected from the group consisting of diammonium citrate, sodium dihydrogen phosphate and sodium hydrogen diphosphate, the solution gives little disadvantageous effect on the rust-proof film of the gas vessel inner surface. The above selection provides further advantages of allowing a mild rinsing work environment and of facilitating a neutralizing operation to be carried out when this acidic rinsing solution is disposed of. Among the above, diammonium citrate is particularly preferred. Namely, diammonium citrate lacks any metal, phosphorous and sulfur components. Then, in case the high-pressure gas vessel is used in the semi-conductor industry, if any portion of the acidic rinsing solution should remain on the inner surface of the vessel, the remaining solution, because of the lack of above-described components, hardly affects the performance of the semiconductor device product.

As described above, with the simple addition of the step of rinsing the inner surface with acidic rinsing solution after the wet-grinding step of rendering the inner surface to the maximum inner-surface roughness Rmax to a predetermined value, there has been achieved a high-pressure gas vessel which can effectively resist scraping-off of the metal cluster from the inner surface or corrosion of the surface so as to restrict mixing of dust into the gas to be taken out of the vessel.

Incidentally, the inner-surface treatment may be effected again after e.g. a periodic inspection of the vessel by charging water into the vessel and then discharging the water therefrom, and then new gas will be charged therein. In such case too, according to the above-described method of the present invention, dust of metal cluster or the like or any other foreign gaseous component will hardly mix into the newly charged gas, so that high quality and purity of this new gas can be maintained. Therefore, it this gas is used for a CVD device or the like, there will hardly occur electrical insulation or conduction failure in the product manufactured by the device. Consequently, it is possible to constantly provide products of invariably high performance.

Further and other objects, features and effects of the invention will become more apparent from the following more detailed description of the embodiments of the invention with reference to the accompanying drawings.

DESCRIPTION OF THE PREFERRED EMBODIMENTS

DETAILED DESCRIPTION OF THE PREFERRED EMBODIMENTS

Embodiments of the present invention will be described in particular with reference to the accompanying drawings.

In this method, first, a wet-grinding step is effected on a high-pressure gas vessel (referred to simply as 'cylinder' hereinafter) made of manganese steel and having a cylindrical configuration so as to render the un-treated, maximum inner-surface roughness (Rmax=12 $\mu$m approximately) of the cylinder into a maximum inner surface roughness: Rmax, of 3 $\mu$m or less. Thereafter the cylinder is subjected to a rinsing step and then to some subsequent steps.

The wet-grinding step will be described in details.

This wet-grinding step is effected by using a machine (see FIG. 7) in which a plurality of cylinders 1 each accommodating therein abrasive 2 and rust preventive are supported horizontally, and these cylinders 1 are revolved counter-clockwise about a common horizontal axis, while each cylinder 1 being driven to rotate or spin clockwise about its own axis, thereby to effect the wet-grinding operation.

Figure 7:
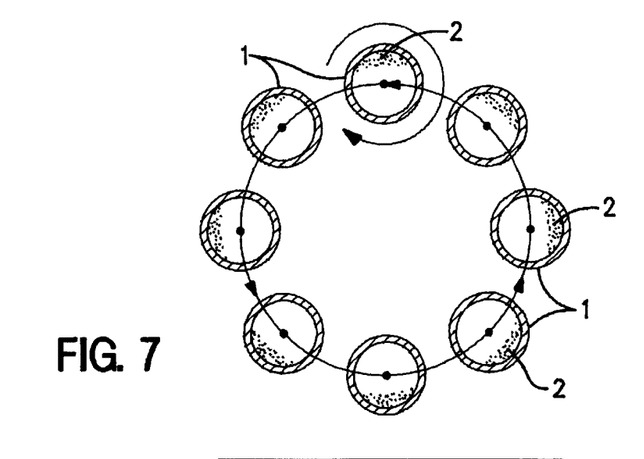
FIG. 7 is a conceptual view of a centrifugal grinding machine.

With the above-described wet-grinding machine in operation, the centrifugal force generated in association with the revolution causes the abrasive 2 in each cylinder to be displaced and concentrated outwardly of the locus of the revolution, and the inner surface of the cylinder 1 is rotated relative to this abrasive 2, so that the inner surface of the cylinder 1 is abraded or ground through its contact with the abrasive 2.

The abrasive 2 includes a first type abrasive which comprises ceramic abrasive constituted from spherical ceramic grains of about 5 mm grain size. This first type abrasive is for use in a primary grinding step for obtaining a maximum inner-surface roughness (Rmax) of 3 to 5 $\mu$m approximately and for eliminating carbon scale present inside the cylinder. The abrasive 2 further includes a second type abrasive which comprises ceramic abrasive having a higher alumina ($Al_2O_3$) content than the first type abrasive used in the primary grinding step. This second type abrasive 2 is for use in a secondary grinding step for obtaining a maximum inner-surface roughness (Rmax) of 1 $\mu$m approximately and also in a finishing grinding step (repetition of the secondary grinding step) for obtaining a maximum inner-surface roughness (Rmax) of 0.8 $\mu$m approximately. With these secondary and finishing grinding steps, a fine and dense rust-proof film is formed inside the cylinder 1.

Incidentally, in an experimental operation carried out by the present inventors, the first type abrasive 2 was used in the amount of 5 to 10 g per 1 liter of water in the primary grinding step, and the second type abrasive 2 was used in the amount of 10 to 20 g per 1 liter of water in the secondary grinding step.

Next, the rinsing step will be described in details.

Figure 8:
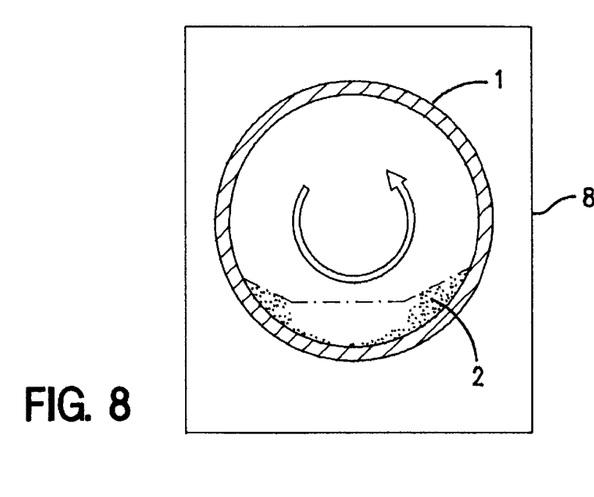
FIG. 8 is a conceptual view of a rotary grinding machine.

First, silica-alumina and pure water are charged into the cylinder 1 ground and finished in the above-described manner. Under this condition, the cylinder 1 is attached to a rotating device 8 (so-called rotary grinding machine (see FIG. 8)). Then, the cylinder 1 is rotated on the machine at a low rotation rate to effect a primary rinsing operation for removing abrasive and/or rust preventive remaining inside the cylinder 1.

Thereafter, the cylinder 1 is subjected to a secondary rinsing operation in which the inner surface of the cylinder is rinsed with pure water to remove any dust adhering to the rust-proof film formed on the inner surface of the cylinder.

Then, the cylinder 1 is further subjected to an acid rinsing step in which an acidic rinsing solution comprising about 0.1% aqueous solution of diammonium citrate is used for removing any dust which has remained un-removed by the secondary rinsing step described above.

After the acid rinsing step, the cylinder is subjected to an after-rinsing operation using pure water again. This after-rinsing operation is effected for preventing the acidic rinsing solution from remaining on the inner wall surface of the cylinder.

After the above-described grinding operations and rinsing operations, the cylinder is baked and then cooled. Thereafter, the cylinder is subjected to various post-treatment operations such as valve attachment, valve tightening, leak inspection, vacuum heating cleaning, gas purging operation and so on, then, the cylinder is charged with gas to be ready for use as a gas cylinder.

Some comparison experiments were conducted to compare the cylinder treated by the above-described inner-surface treating method of the invention with a variety of reference cylinders. These comparison experiments will be described next.

<COMPARISON EXPERIMENT EXAMPLE 1>

This experiment was conducted to find out the degree of difference in the generation amount of metal dust that the pure-water rinsing operation and the acidic solution rinsing operation can make. Specifically, comparisons were made among: (A) a cylinder treated by the inner-surface treatment method of the present invention; (B) a cylinder treated with the grinding operations, but without the acid rinsing operation; (C) a cylinder treated with the acid rinsing operation alone; and (D) a cylinder treated with neither the grinding operations nor the acid rinsing operations. The results of the experiment are shown in FIG. 1.

Figures 1A, 1B:
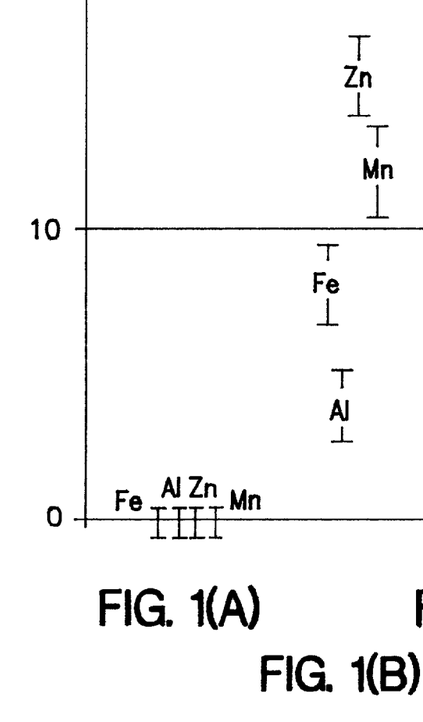
FIGS. 1(A)–1(D) are graphs showing results of an experiment conducted in a comparison experiment example <1>.
Figure 1C:
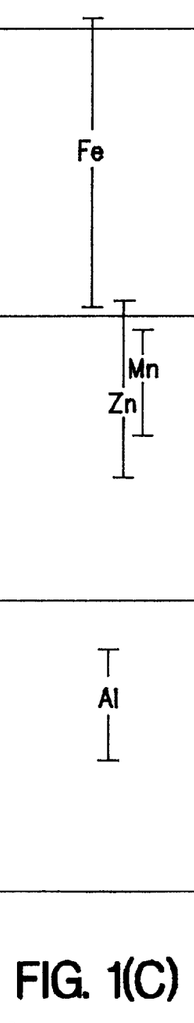
Figure 1D:
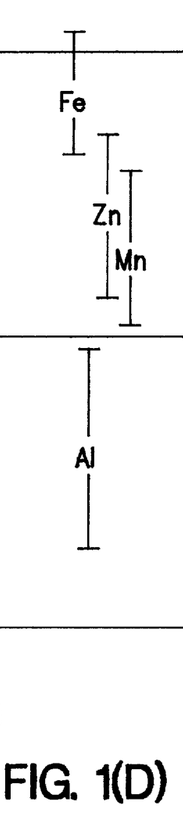

As shown in FIG. 1, in the case of the cylinders not treated with the wet-grinding operations, a significant amount of metal dust was generated, and this amount of metal dust could not be reduced by the acid rinsing operation alone. On the other hand, in the case of the cylinders treated with the wet-grinding operations, with the acid liquid cleaning operation, the amount of generated metal dust could be restricted to substantially 0 (zero) (weight ppb) (below the detection limit).

<COMPARISON EXPERIMENT EXAMPLE 2>

Figure 2:
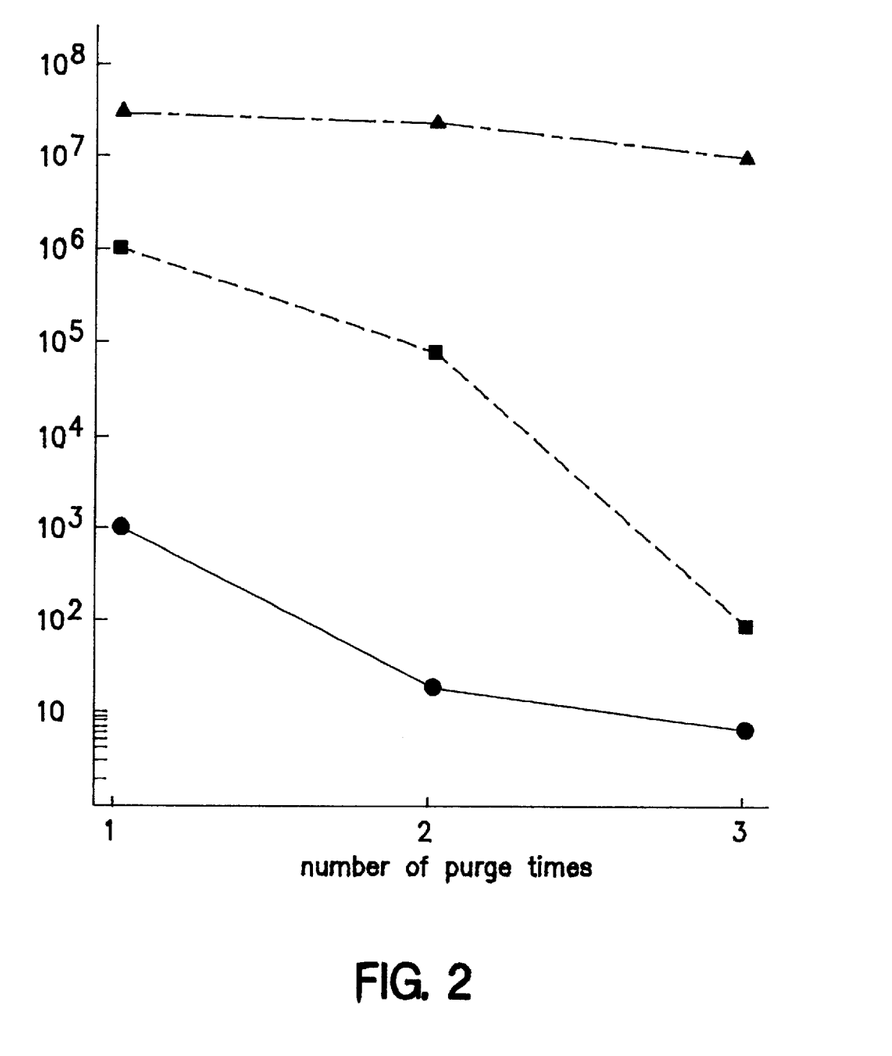
FIG. 2 is a graph showing results of an experiment conducted in a comparison experiment example <2>.

Regarding the amount of dust generated in the cylinder in nitrogen gas purging operations carried out one after another, comparisons were made between (A) a cylinder treated by the inner-surface treating method of the present invention; and (B) a cylinder treated with the grinding operations, but without the acid rinsing operation. The results are shown in FIG. 2. In the figure, there is also shown result obtained of a further reference cylinder (Aa) which was treated by the inner-surface treating method carried out in a clean area.

As shown in FIG. 2, the amount of dust generated in the gas purging operations gradually decreased after each gas purging operation. However, in the case of the cylinder (B) without the acid rinsing operation, in the third gas purging operations, the dust amount was decreased only to $10^7$ units/cft approximately. Whereas, in the case of the cylinder (A) treated by the method of the invention, in the third gas purging operation, the dust amount was decreased from the initial dust amount of about $10^6$ units/cft to $10^2$ units/cft approximately. Further, in the case of the other reference cylinder treated with the method of the invention effected in a clean area, the dust amount was further decreased to 10 units/cft or less.

Based on the above-described observations, the lack of reduction in the dust amount in the case of lack of the acid rinsing operation seems to be attributable to the fact that new dust was generated from the inner wall surface of the cylinder with each another gas purging operation. And, the observations suggest that the acid rinsing operation could restrict such generation of new dust from the inner wall surface of the cylinder.

Incidentally, the 'dust' as used herein refers to solid components dispersed in the nitrogen gas and having a particle diameter of 0.1 $\mu$m or more.

<COMPARISON EXPERIMENT EXAMPLE 3>

Figure 3:
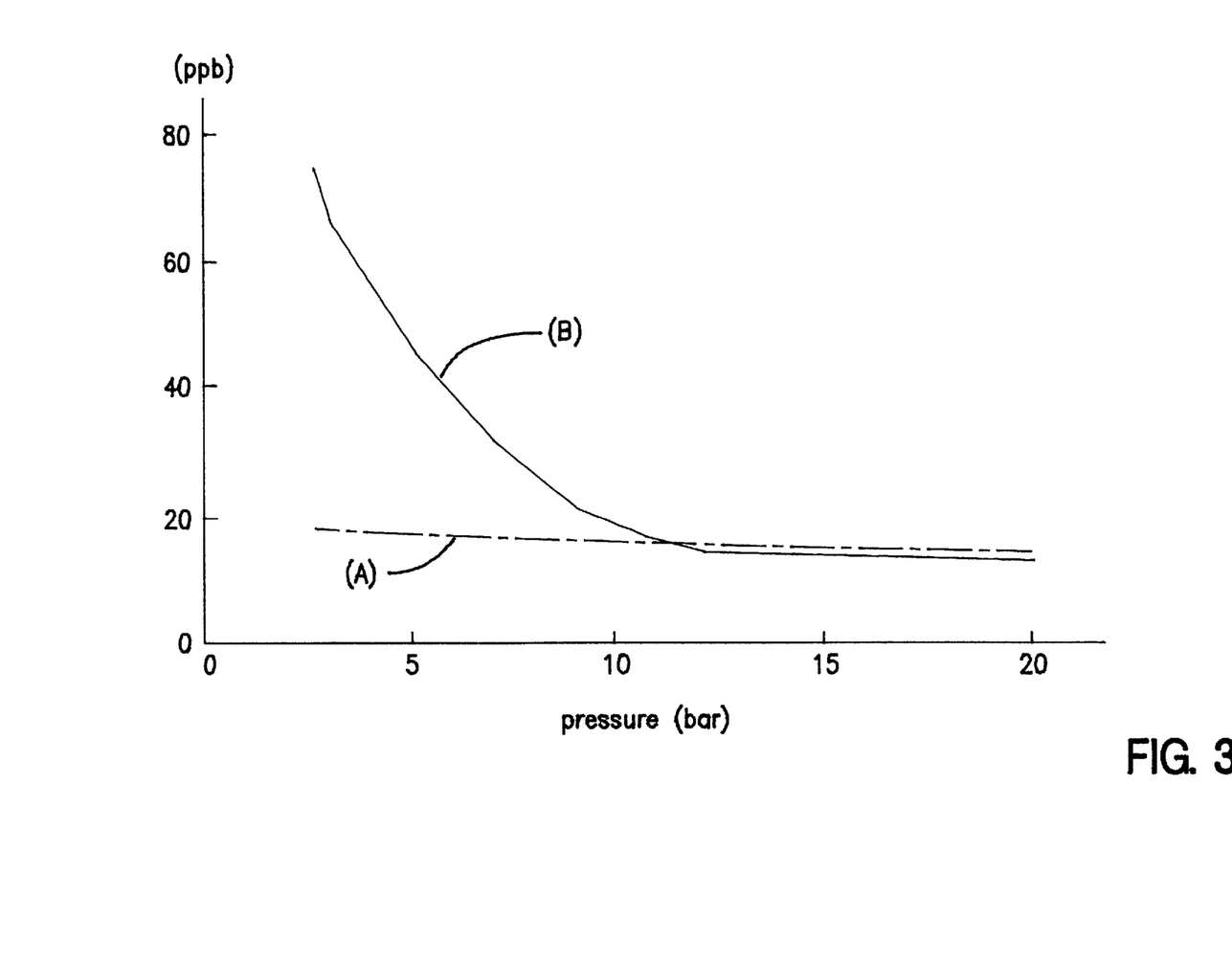
FIG. 3 is a graph showing results of an experiment conducted in a comparison experiment example <3>.

In this experiment, (A) a cylinder treated by the inner-surface treating method of the invention and a cylinder (B) treated with the grinding operations, but without the acid rinsing operation were compared to each other to find out difference therebetween in moisture adsorbing characteristics thereof. The results are shown in FIG. 3. For the comparison, a test piece was put into each cylinder treated with the inner-surface treatment. Then, the inner pressure of the cylinder was released to observe resultant change in the moisture concentrations inside the cylinder.

As shown in FIG. 3, in the case of the cylinder without the acid rinsing operation, although no moisture content apparently seemed to be adsorbed on the inner surface under the high pressure condition, moisture content appeared and desorbed from the inner surface with the reduction of the inner pressure of the cylinder. So that, this moisture content may mix into the gas. On the other hand, in the case of the cylinder treated with the inner-surface treating method of the invention, it is believed that the inner surface of the cylinder was made highly resistant against moisture adsorption. Accordingly, the results indicated that the cylinder treated by the inner-surface treating method of the invention had obtained fine and dense inner surface highly resistant against moisture adsorption thereto.

Figure 4:
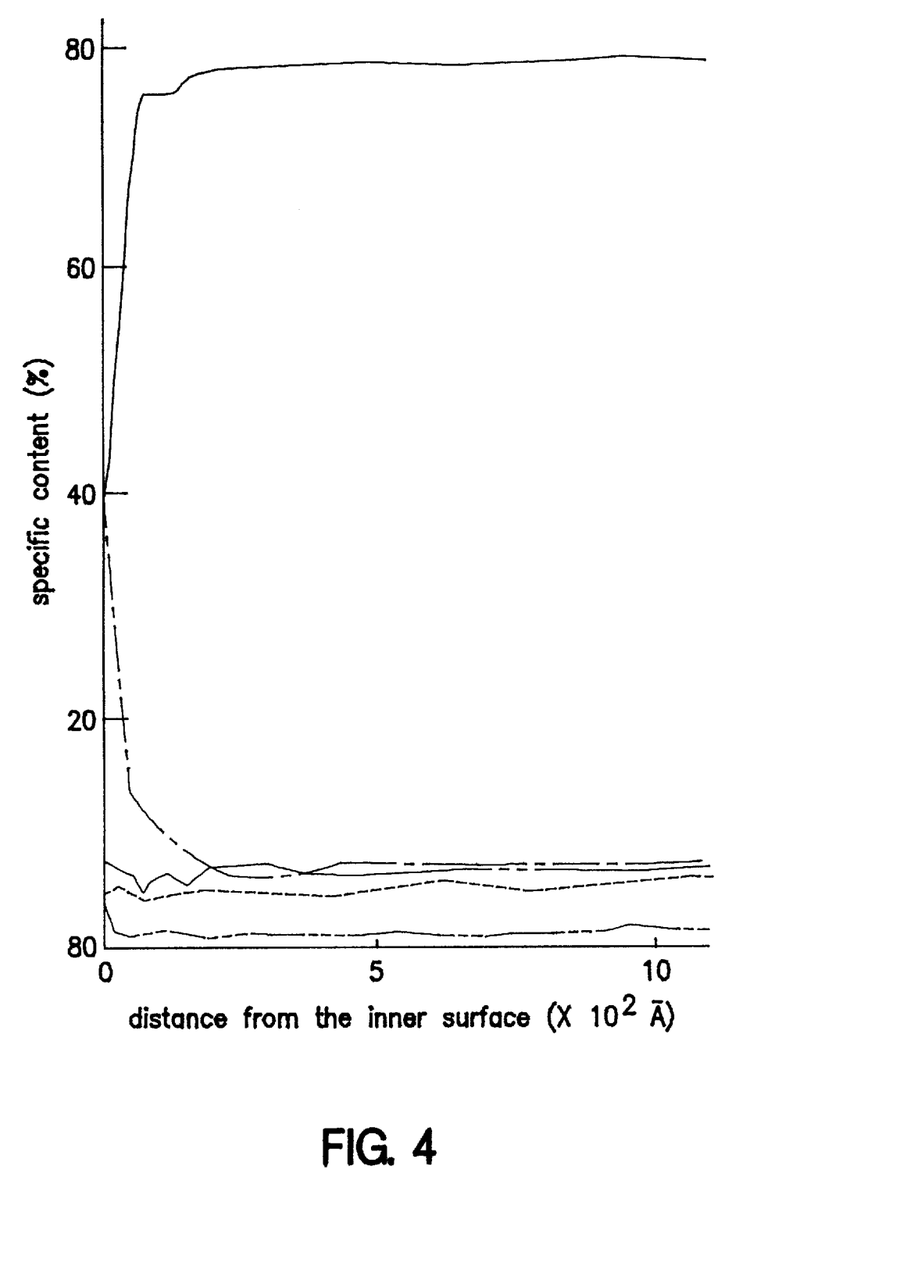
FIG. 4 is a graph showing results of analysis of an inner surface of a cylinder relating to the comparison experiment example <2>, FIG. 5 are graphs showing results of an experiment conducted in a comparison experiment example <4>.

Then, an analysis was made on the inner surface of the cylinder treated by the inner-surface treating method of the invention. The result of the analysis is shown in FIG. 4. With this analysis as shown, it was confirmed that a fine and dense rust preventive film constituted mainly from iron oxide was formed on the inner surface.

<COMPARISON EXPERIMENT EXAMPLE 4>

A comparison was made between a cylinder (A) treated with the inner-surface treating method of the present invention and a cylinder (B) treated with the grinding operations, but without the acid rinsing operation in order to find out difference therebetween in the stability of silane gas when the silane gas was charged into each cylinder. The result of the comparison is shown in FIG. 5.

Figure 5A:
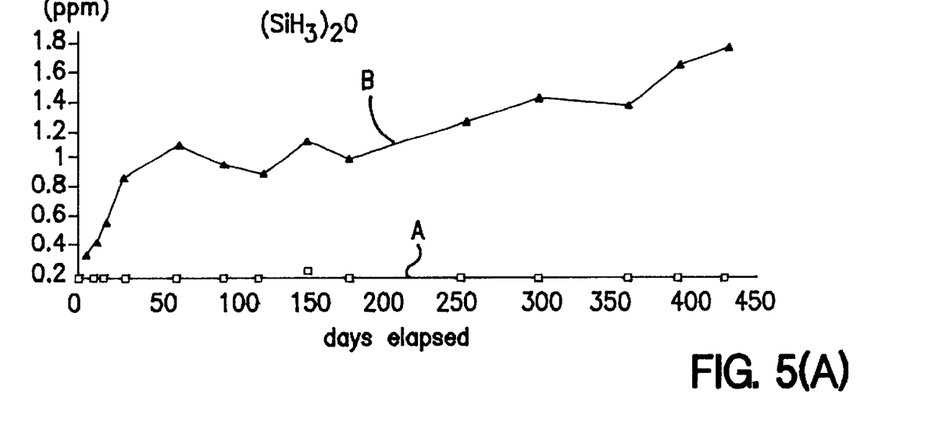
Figure 5B:
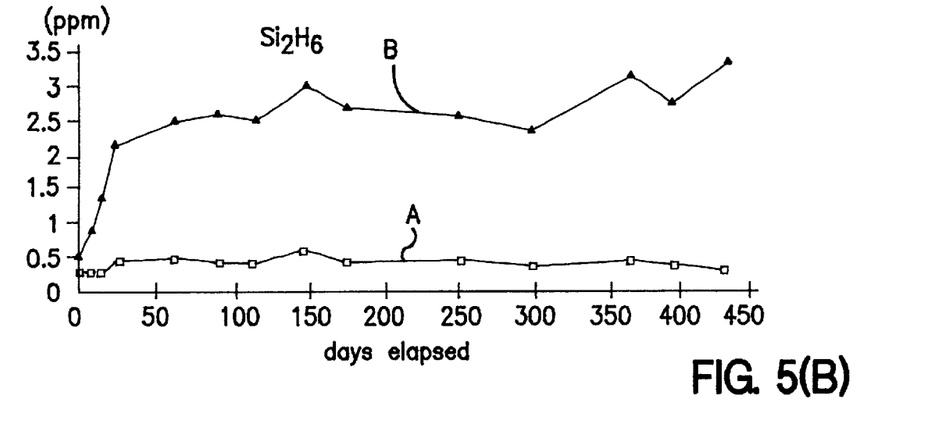
Figure 5C:
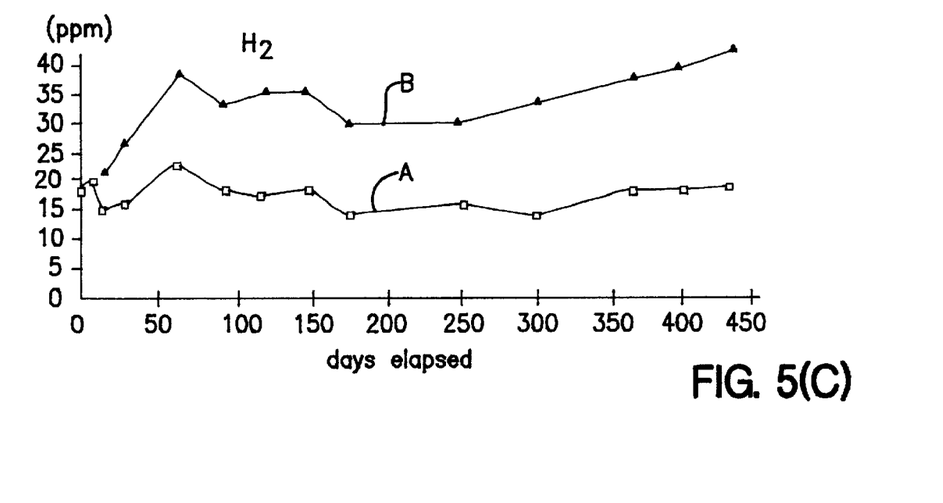
Figure 6:
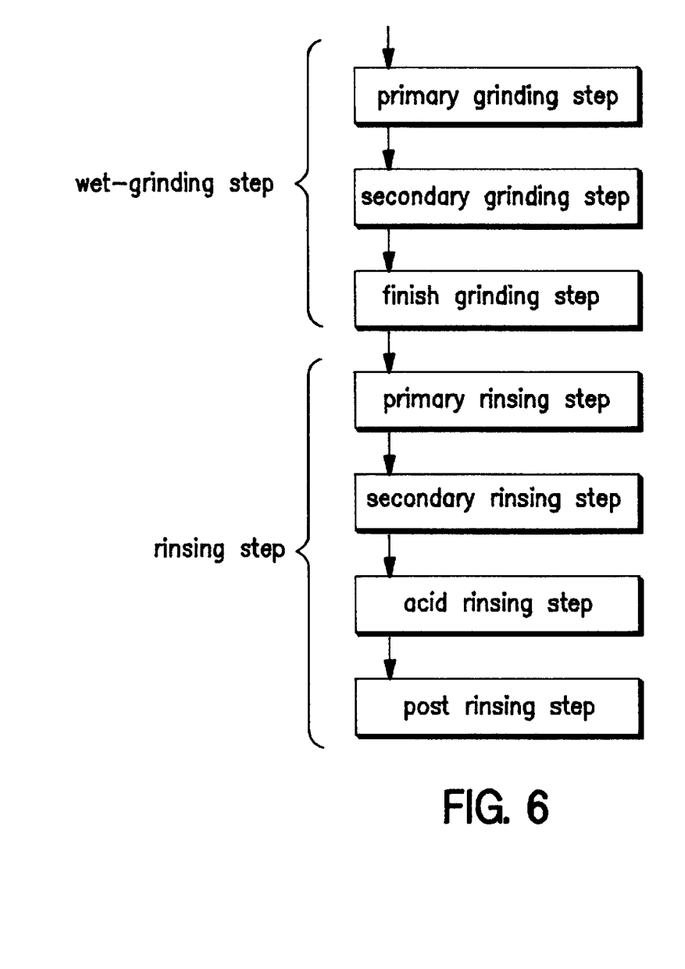
FIG. 6 is a flow chart illustrating the invention's method of treating an inner surface of a high-pressure gas vessel.

As shown in FIG. 5, in the case of the cylinder (B), an increasing tendency was observed in both di-silane ($Si_2H_4$) and hydrogen ($H_2$) due to decomposition of the silane gas. Further, generation of siloxane was also observed. Therefore, it is believed that the silane gas was decomposed by moisture content or oxygen adsorbed on the inner surface of the cylinder. On the other hand, in the case of the cylinder (A), such increase of di-silane ($Si_2H_4$) and hydrogen ($H_2$) due to decomposition of the silane gas was not observed. Also, the generation amount of siloxane was below the detection limit. Therefore, it may be reasoned that the stability of silane gas was maintained high because of the acquired high resistance of the inner surface against moisture or oxygen adsorption thereto.

Some other embodiments of the invention will be specifically described next.

(1) The material forming the high-pressure gas vessel is not particularly limited in the present invention. The vessel may be formed of chrome molybdenum steel or any other kind of steel alloy conventionally used for forming a high-pressure gas vessel, provided that the selected material is usable for forming a high-pressure vessel which can satisfy the maximum inner-surface roughness (Rmax) requirement of 3 $\mu$m or less.

(2) As to the acidic component of the acidic rinsing solution, sodium dihydrogen phosphate or sodium hydrogen disphosphate free from phosphorus content may be employed as well. However, diammonium citrate containing neither phosphorous content nor metal content is preferred in particular. The concentration of the acidic rinsing solution may vary within a range of 1% or less which range is non-detrimental to the rust-preventive film. However, the concentration of about 0.1% is particularly preferred as being capable of achieving sufficient rinsing effect while restricting the amount of the acidic solution to be used.

Further, those steps subsequent to the acid rinsing step may be effected in any conventional manners.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A method of treating an inner surface of a high-pressure gas vessel, the method comprising the steps of:

introducing an abrasive (2) containing rust preventive into the high-pressure gas vessel (1) comprising at least one of manganese steel or chrome-molybdenum steel;

wet grinding the inner surface of the vessel (1); and rinsing the inner surface of the vessel; wherein said wet-grinding step is effected to obtain in the vessel interior a maximum inner-surface roughness, Rmax, of no more than 3 $\mu$m; and said rinsing step is performed using an acidic rinsing solution comprising at least one selected from the group consisting of diammonium citrate, sodium dihydrogen phosphate and sodium hydrogen diphosphate.

2. A method according to claim 1, wherein in said wet-grinding step, said high-pressure gas vessel (1) is supported horizontally, with the vessel (1) accommodating therein said abrasive (2) containing rust preventive, and said vessel (1) under this condition is revolved in a first direction about a horizontal revolution axis which lies outside the vessel while the vessel (1) is simultaneously spun about its own axis of symmetry in a direction opposite to said first direction.

3. A method according to claim 1, wherein said wet-grinding step is carried out by centrifugally grinding the inner surface through use of a machine which spins the vessel.

4. A method according to claim 1, wherein said wet-grinding step includes:

a primary grinding step using ceramic abrasive containing alumina and having about 5 mm grain size as said abrasive (2);

a secondary grinding step using further ceramic abrasive having a higher alumina content than said ceramic abrasive used in said primary grinding step; and a finishing grinding step comprising a repetition of said secondary grinding step.

5. A method according to claim 4, whereins aid primary grinding step uses said abrasive (2) in the amount of about 5 to 10 g per 1 liter of water and said secondary grinding step uses said further abrasive (2) in the amount of about 10 to 20 g per 1 liter of water.

6. A method according to claim 4, wherein said rinsing step includes:

a primary rinsing step in which said high-pressure gas vessel (1) after said finishing grinding step is attached to a rotary machine which drives the vessel (1) to spin about an axis thereof at a low rotation rate with the vessel (1) accommodating therein silica-alumina abrasive and pure water, so as to remove any of the abrasive and/or the rust preventive which may remain inside the vessel (1) from the wet-grinding step; and a secondary rinsing step for rinsing the inner surface of the high-pressure gas vessel (1) with pure water to remove any dust which may be adhering to a rust-proof film formed on the inner surface during the secondary and finishing grinding steps.

7. A method according to claim 6, wherein in said acid rinsing step, about 0.1% aqueous solution of diammonium citrate is used for removing dust which has remained un-removed by said secondary rinsing step and still adhering to the rust-proof film; and said rinsing step further includes a final rinsing step using pure water again for preventing said acidic rinsing solution from remaining on the inner surface of the high-pressure gas vessel (1).

* * * * *